United States Patent

[11] 3,567,913

| [72] | Inventors | James E. Webb, Administrator of the National Aeronautics and Space Administration with respect to an Invention of<br>William E. Baumer, San Peoro; John D. Timm, Camarillo, Calif. |
|---|---|---|
| [21] | Appl. No. | 723,827 |
| [22] | Filed | Apr. 24, 1968 |
| [45] | Patented | Mar. 2, 1971 |

[54] COUNTER
7 Claims, 1 Drawing Fig.

[52] U.S. Cl. ................................................. 235/92,
328/49
[51] Int. Cl. ..................................................... H03k 2/16,
G06m 3/02
[50] Field of Search............................................. 235/92
(63), 92 (58), 92 (55), 92 (70), 92 (60), 92 (297)

[56] References Cited
UNITED STATES PATENTS

| 3,420,990 | 1/1969 | Andrea.......................... | 235/92 |
| 2,735,005 | 2/1956 | Steele............................ | 250/27 |

Primary Examiner—Daryl W. Cook
Assistant Examiner—Robert F. Gnuse
Attorneys—D. E. Leslie, J. H. Warden and G. T. McCoy

ABSTRACT: Pulse counting apparatus capable of operating over a wide range of pulse rates, which indicates the exact time of occurrence of pulses occurring at long intervals and the pulse rate for pulses occurring at short intervals. The circuit comprises a first portion for registering the first seven pulses to be received, a second portion for counting the number of clock signals generated before a first pulse is received by the counting apparatus, and a third portion for erasing the clock signal count in the second portion and enabling the second portion to count additional pulses received by the counter when seven or more pulses have been received.

PATENTED MAR 2 1971          3,567,913
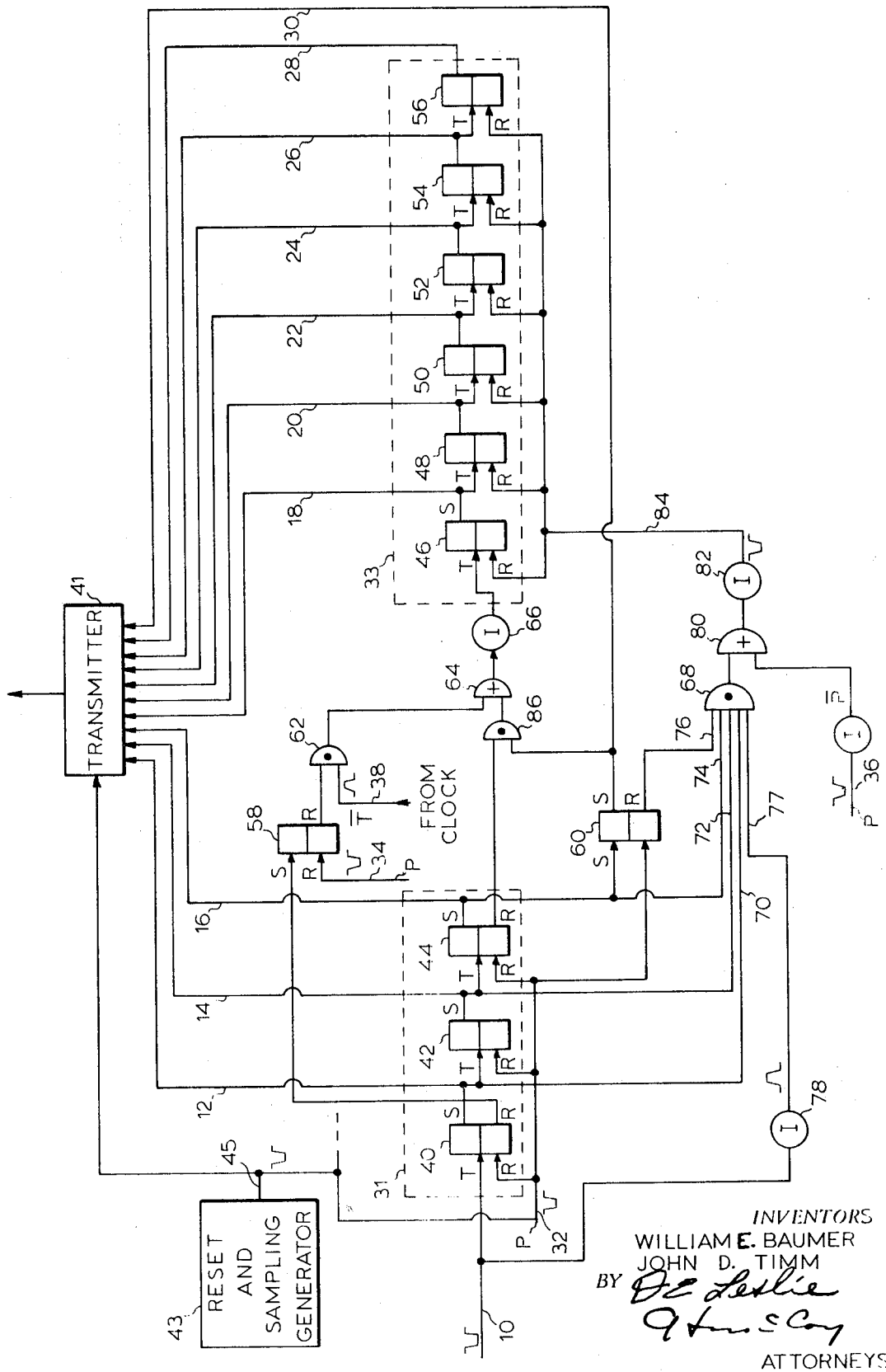
INVENTORS
WILLIAM E. BAUMER
JOHN D. TIMM
BY
ATTORNEYS

3,567,913

COUNTER

ORIGIN OF INVENTION

The invention described herein was made in the performance of work under a NASA contract and is subject to the provisions of Section 305 of the National Aeronautics and Space Act of 1958, Public Law 85—568 (72 Stat. 435; 42 USC 2457). 2457).

BACKGROUND OF THE INVENTION

This invention relates to counting circuits.

In some applications, it is necessary to quantitatively measure phenomena whose magnitude may vary within extremely wide limits. For example, extraterrestrial spacecraft often contain instruments for measuring radiation, the level of which may vary within extremely wide and unknown limits. Radiation and many other phenomena are detected by instruments which yield pulses at a rate dependent upon the magnitude of the phenomenon being measured. For example, ionizing radiation is often measured by ion chambers which generate a pulse each time an ionizing particle passes therethrough.

Counting circuits of types well known in the art can be used to count pulses obtained from ion chambers and the like, with the count sampled at periodic intervals. In some situations, a pulse may occur only once during a long period of time. In such a case, it is often desirable to determine the exact time of occurence of the pulse. For example, if an ion sensor is rotating so that at different times during a sampling interval it is pointing in a different direction, a determination as to when a pulse occurred also indicates the orientation of the ion sensor at the time of the ion event.

OBJECTS AND SUMMARY OF THE INVENTION

Accordingly, one object of the present invention is to provide a circuit which is capable of counting pulses received at a very low or very high rate, and which indicates the time of occurrence of pulses for very low pulse rates.

Another object of the invention is to provide a circuit for efficiently measuring very low and very high pulse rates.

In accordance with the present invention, there is provided a circuit for measuring a wide range of pulse rates by utilizing a high capacity counter. The counter is reset to zero after each readout, to begin a new sampling interval. The counter circuit includes a first portion which counts the first several pulses to be received. A second portion of the circuit counts pulses or signals from a clock during the period between the beginning of a sampling interval and the receipt of the first pulse by the circuit. The number of clock signals counted indicates the time of receipt of the first pulse. If a larger number of pulses is recieved during an interval so that the first circuit portion cannot count more pulses, the clock signal count in the second circuit portion is dumped, i.e., the second portion is reset, and the additional pulses are counted in the second portion. Thus, the second circuit portion has two functions: at low pulse rates it counts clock signals, and at high pulse rates it counts pulses overflowing from the first circuit portion.

One embodiment of the invention includes two groups of binary cells, such as a total of 9 cells, to count a maximum of $2^9$ pulses. The first pulses to be received are registered in a first group of three cells which can count up to seven pulses. Before the first pulse is received, however, a second group of six cells counts clock signals. When the seventh pulse is recieved, the clock signal count in the second group of six cells is reset to zero; thereafter arithmetic carries from the overflowing first group of three cells are delivered to the second group. Thus, at high pulse rates, the second group counts the most significant digits of the pulse count, while at low pulse rates it indicates the time at which the first pulse was received since the last sampling. At each sampling, the entire nine cells are reset to zero.

A more complete understanding of the invention may be had by referring to the following specification and claims, when taken in conjunction with the accompanying drawings.

BRIEF DESCRIPTION OF THE DRAWING

The FIGURE is a schematic view of one embodiment of the invention.

DESCRIPTION OF THE PREFERRED EMBODIMENT

The circuit of the FIGURE comprises an input 10 for receiving negative pulses and 10 output lines 12, 14, 16, 18, 20, 22, 24, 26, 28, and 30. The 10 output lines indicate the number of pulses received and/or the time at which the first pulse was received, during a sampling interval. At the end of each sampling interval, the binary signals on the output lines even numbered 12 through 30 are read out by a transmitter 41, which transmits the count to a receiving station.

The ending of each sampling interval and beginning of another is controlled by a reset and sampling generator 43. At the end of each interval, the generator 43 delivers a rest pulse P, which is a negative pulse, over its output line 45. The pulse causes the transmitter 41 to transmit the circuit count indicated on the lines 12 through 30. The negative pulse is also delivered to input lines 32, 34, and 36, labeled P, which are all connected to the output 45. The pulses at 45 reset the count in the counter to zero. At all times, clock signals are received at input 38 labeled $\overline{T}$, the clock signals at 38 being positive pulses.

In general, the circuit includes a counting portion 31 serving as means for counting discrete inputs, which are in the form of negative electrical pulses received at input 10. The counting portion 31 comprises three binary cells 40, 42, and 44, which hold a maximum count of seven, and the last cell 44 of the three serves as a carry output means for generating a carry when the eighth pulse is received. Another counting portion 33 of the circuit comprising six binary cells serves as a means for counting inputs, which are delivered to the trigger input T of cell 46. Still another circuit portion which includes gate 86, serves as a means for coupling the last cell 44 of the counting portion 31 to the counting portion 33 to enable the portion 33 to count arithmetic carries. Each of the cells of the two counting portions includes a resetting means for enabling it to be reset to an initial state. The generator 43 serves as a means for operating the resetting means of the cells in the two counting portions to establish a zero count at the beginning of a sampling period.

A clock input at 38, which is coupled to the counting portion 33 causes portion 33 to count clock signals before any pulses are delivered to the circuit at 10, to indicate the time at which the first pulse was received at 10. In those situations wherein a large number of pulses may be received at 10, so that carries may be generated by cell 44, the count in the second counting portion 33 should be reset to zero. A circuit portion including gate 68 which is coupled to the cells in the counting portion 31, generates a signal which deletes any clock signal count in the counting portion 33 prior to the transmittal of arithmetic carries from counting portion 31 to portion 33. Thus, at low pulse rates, the portion 33 indicates the number of clock signals prior to the receipt of a first pulse at 10. However, at a high pulse rates, the portion 33 instead indicates the most significant digits of the count in the circuit.

The circuit shown in the FIGURE includes a total of 11 flip-flops designated 40, 42, 44, 46, 48, 50, 52, 54, 56, 58, and 60. Each of the flip-flops is of the AC type, which is changed only by the negative-going portion of pulse inputs thereto. Thus, only the trailing edge of a positive pulse will trigger, set, or reset a flip-flop when delivered to its T, S, or R input, respectively. The circuit also includes a number of AND and OR gates, and inverters labeled I.

The input at 10 may be connected to any of a variety of detecting instruments. In one application, the input at 10 is connected to an ion chamber on board a spacecraft for measuring radiation by counting the number of ionizing particles passing through the chamber.

At the beginning of each sampling interval, a negative pulse is delivered by the generator 43 to input lines 32, 34, and 36. This resets all 11 flip-flops, thereby reducing all counts to zero. Until the first count pulse is received at 10, the second counting portion 33 counts clock pulses from clock input 38. The counting of clock pulses can occur because the flip-flop 58 is in a reset state prior to receipt of a first pulse at 10. The reset output of flip-flop 58 opens AND gate 62 so that clock signals at 38 pass therethrough. The clock signals pass through OR gate 64 and inverter 66, which converts them to negative pulses, and then into the trigger input of flip-flop 46.

The first clock pulse changes flip-flop 46 from its reset state to a set state. Flip-flop 46 then delivers a pulse on its set output to the trigger input of flip-flop 48. Flip-flop 48 is not triggered inasmuch as it is AC coupled and only the downward portion of a pulse input will cause a change of state. The next clock pulse at 38 passes through AND gate 62, OR gate 64 and inverter 66, to change flip-flop 46 to its reset state. This results in the set output of flip-flop 46 dropping to zero and triggering flip-flop 48 to cause it to change from its reset to a set state. Additional clock pulses are similarly counted by the group of flip-flops 46 through 56.

When the first count pulse is received at 10, it is registered in flip-flop 40. Additionally, the first count pulse at 10 causes AND gate 62 to turn off, as will be described, so that no further clock pulses can be recorded by the flip-flops 46 through 56. The pulse at 10 triggers flip-flop 40 to change it to a set state. The R output of flip-flop 40 thereupon drops to zero, and it then delivers a negative-going pulse portion to the set input of flip-flop 58. This negative pulse portion changes flip-flop 58 from a reset to a set condition, thereby terminating the delivery of a signal to gate 62. Gate 62 is thereafter closed unit a new reset pulse is delivered to the circuit at the beginning of a new sampling interval. The closing of gate 62 terminates the counting of clock pulses by flip-flops 46 through 56. This may occur before any clock pulses are counted, if a pulse is received at 10 immediately after the beginning of a sampling interval.

The second count pulse at 10 causes flip-flop 40 to return to its reset state. The resetting of flip-flop 40 causes the delivery of a negative pulse portion to the trigger input of the next flip-flop 42 and changes flip-flop 42 to a set state. Successive count pulses at 10 are counted by the cells 40, 42 and 44 until the seventh pulse is received.

Until the receipt of the seventh count pulse at 10, AND gate 68 is closed. Upon receipt of the seventh count pulse at 10, the set outputs of the flip-flops 40, 42, and 44 are all high, so that the inputs 70, 72, and 74 to AND gate 68 are high. The input 76 to the AND gate 68 is still high, inasmuch as flip-flop 60 is still reset. The input 77 to gate 68 is also high because it receives a positive pulse from inverter 78, when the seventh pulse is received at input 10. Thus, gate 68 delivers a positive pulse when the seventh pulse is received by the circuit. The positive pulse from gate 68 passes through OR gate 80, causing inverter 82 to provide a negative pulse on line 84. The negative pulse at 84 resets the six flip-flops 46 through 56 so that any count therein resulting from receipt of clock pulses at input 38 is obliterated.

The eighth count pulse at 10 causes the resetting of the three flip-flops 40, 42, and 44. As a result, the set output of flip-flop 44 drops to zero, resulting in a negative-going pulse portion at the set input of flip-flop 60. This results in setting of flip-flop 60, thereby preventing the passage of any more pulses through AND gate 68, which could reset the six flip-flops 46 through 56. The set output of flip-flop 60 passes through AND gate 86, OR gate 64 and inverter 66, resulting in the delivery of a negative-going pulse portion to the trigger input of flip-flop 46. Flip-flop 46 is thereupon changed to its set state, thereby recording the eighth pulse. It may be noted that AND gate 86 is open because flip-flop 44 is now reset.

The ninth through 11th pulses are counted by flip-flops 40 and 42. The 12th pulse causes flip-flop 44 to be set, the delivery of a low output through AND gate 86 and OR gate 64, and the delivery of a high output by inverter 66 to the trigger input of flip-flop 46. AND gate 86 will continue to be open to pulses from flip-flop 44 inasmuch as flip-flop 60 remains set until the beginning of the next sampling interval. When the 16th count pulse is received at input 10, flip-flop 44 is again reset, resulting in a high output from its reset output passing through AND gate 86 and OR gate 64, and a low output being delivered by inverter 66. The fall in the output from inverter 66 results in flip-flop 46 triggering from its set to a reset state, and causing flip-flop 48 to be triggered from its reset to a set state. Additional carries from flip-flop 44 are similarly counted by the six flip-flops 46 through 56.

The total number of pulses counted by the circuit can be read out by noting the state of the signals on output lines 12 through 30. The binary signal on line 12 indicates the least significant binary digit and the signal on line 28 indicates the most significant binary digit. A determination of whether the count on lines 18 through 30 represents the number of clock signals received before receipt of a first count pulse at 10, or instead represents the most significant digits in the count of pulses received at 10, is made by noting the output at line 30. If flip-flop 60 is reset, then this indicates that no carries have been transferred from the flip-flop 44 to flip-flop 46, and that the counts on lines 18 through 28 represent the number of clock signals from input 38. On the other hand, if the line 30 is high, indicating flip-flop 60 is in a set state, this means that a carry has been passed from flip-flop 44 to flip-flop 46. In that case, the signals on lines 12 through 28 represent only the total number of count pulses which have been received at 10 by the counting circuit. The signals on the lines 12 through 30 are passed to transmitting circuitry in the transmitter 41 at the end of the sampling interval.

Thus, the circuit provides means for indicating the time between the beginning of the sampling interval and the time of receipt of the first pulse during the interval, in those cases where six or fewer pulses have been received during the sampling interval. In addition, the circuit indicates the total number of count pulses which have been received during the sampling interval in all cases, regardless of the number of count pulses which have been received. The time of receipt of the first pulse during a sampling interval generally is useful only in the case of low pulse rates, and such information is provided in those cases. It is important in all cases to determine the total number of pulses which have been received during a sampling interval, and this information is provided in all cases. The circuit makes maximum use of the counting flip-flops 46 through 56, by utilizing them to indicate the time of receipt of the first pulse for low pulse rates, and for utilizing them to count pulses for high pulse rates when information as to time of receipt of the first pulse is generally not required.

While a particular embodiment of the invention has been illustrated and described, it should be understood that many modifications and variations may be resorted to by those skilled in the art, and the scope of the invention is limited only by a just interpretation of the following claims.

We claim:

1. A counter for providing a sum of discrete inputs to be counted comprising:
   first means for counting said inputs to be counted, including carry output means for generating carries when the count in said first means reaches a predetermined level;
   second means for counting inputs thereto;
   third means for coupling said carry output means to said second means to enable said second means to count carries generated by said carry output means;
   clock means for generating clock pulses, said clock means coupled to said second means to provide a count therein representing the elapsed time prior to an input being received by said first means; and means responsive to said inputs to be counted for decoupling said clock means from said second means upon receipt of a first of said inputs to be counted.

2. A counter as defined in claim 1, including:

resetting means responsive to the count in said first means for deleting the count of clock pulses in said second means prior to transmittal of carries from said first means to said second means.

3. A counter for providing a sum of discrete inputs to be counted comprising:

first means for counting said inputs to be counted, including carry output means for generating carries when the count in said first means reaches a predetermined level;

second means for counting inputs thereto;

third means for coupling said carry output means to said second means to enable said second means to count carries generated by said carry output means;

clock means for generating clock signals at regular intervals;

gate means responsive to inputs to said first means for transmitting said clock signals to said second means during an interval which terminates upon the receipt of an input by said first means;

reset means responsive to the count in said first means for resetting the count in said second means to a reference level upon the attainment of a predetermined count in said first means; and means responsive to the operation of said reset means for indicating that the count in said second means represents only carries.

4. A counter for providing a sum of discrete inputs to be counted comprising:

a first plurality of binary cells connected in tandem to count said inputs, with a first of said binary cells responsive to said inputs to be counted and another of said binary cells constructed to generate carries when the count in said first plurality of cells reaches a predetermined level;

a second plurality of binary cells connected in tandem;

means for coupling carries from first plurality of cells to said second plurality of cells, to enable said second plurality of cells to count carries;

clock means for generating clock signals;

gate means for delivering said clock signals to a first cell of said second plurality of cells when said gate means is open;

means for closing said gate means when a first input to be counted is received by said first cell of said first means;

reset means responsive to the count in said first plurality of cells for setting the count in said second plurality of cells to an initial value between the attainment of a count in said first plurality of cells equal to the highest count registerable therein before a carry is generated and the receipt of one input to be counted after the attainment of said highest count; and output means coupled to said reset means for indicating the occurence of a setting of the count in said second plurality of cells to said initial value.

5. A counter for counting input pulses during a sampling period comprising:

a first plurality of binary memory cells connected in tandem, a first of said cells having an input for receiving said input pulses to be counted and a last of said cells having an output for generating carries;

a second plurality of cells connected in tandem for registering counts;

first reset means coupled to said first plurality of cells for resetting said first plurality of cells to a state indicating a zero count therein;

second reset means coupled to said second plurality of cells for resetting said second plurality of cells to a state indicating a zero count therein;

operating means coupled to said first and second reset means to operate them and establish a zero count in said first and second plurality of cells at the beginning of a sampling period;

clock means for generating clock signals;

a gate responsive to a first input pulse to be counted for passing signals from said clock means to a cell of said second plurality of cells during an interval which terminates upon the receipt of a first pulse to be counted by said first plurality of cells;

means responsive to said operating means for opening said gate at the beginning of a sampling period;

overflow means responsive to the count in said first plurality of cells and coupled to said seocnd reset means for resetting said second plurality of cells to an initial count at a time substantially between the attainment of a maximum count in said first plurality of cells and the delivery of a carry therefrom; and means coupling a last of said first plurality of cells to a first cell of said second plurality of cells for enabling the counting of carries from said first plurality of cells by said second plurality of cells.

6. A counter as defined in claim 5 wherein:

said second reset means comprises an AND gate having inputs connected to an output of each of said cells in said first plurality of cells and an output connected to each of said cells of said second plurality of cells.

7. A counter as defined in claim 5 including:

means coupled to said overflow means for generating a binary signal indicating the occurrence of a resetting of said second plurality of cells substantially between said attainment of a maximum count in said first plurality of cells and the delivery of a carry therefrom.